March 23, 1965 J. E. LINDBERG, JR., ETAL 3,175,206
FIRE DETECTOR WITH INTEGRITY-TESTING DEVICE
Filed July 14, 1964 2 Sheets-Sheet 1

INVENTORS.
JOHN E. LINDBERG, JR.
STEPHEN A. MILLER
BY

ATTY.

March 23, 1965   J. E. LINDBERG, JR., ETAL   3,175,206
FIRE DETECTOR WITH INTEGRITY-TESTING DEVICE
Filed July 14, 1964   2 Sheets-Sheet 2

INVENTORS.
JOHN E. LINDBERG, JR.
STEPHEN A. MILLER
BY

Owen, Wickersham, & Erickson

ATTY.

_United States Patent Office_

3,175,206
Patented Mar. 23, 1965

3,175,206
FIRE DETECTOR WITH INTEGRITY-TESTING DEVICE
John E. Lindberg, Jr., 1211 Upper Happy Valley Road, Lafayette, Calif., and Stephen A. Miller, Albany, Calif.; said Miller assignor to said Lindberg
Filed July 14, 1964, Ser. No. 383,554
26 Claims. (Cl. 340—214)

This invention relates to an improved fire-detection system having a system-integrity test device.

This application is a continuation-in-part of both applications Serial Nos. 149,428 and 149,312, both filed November 1, 1961, and both now abandoned.

A widely used type of fire detector employs a tubular cable having two electrical conductors separated by a heat-sensitive material that is normally of low electrical conductivity, and that becomes more conductive at a critical temperature. Some typical devices of this type are shown in Walbridge's Patent No. 2,413,125 (heat-sensitive sodium or potassium nitrate inside a copper tube and separating the tube from an axial copper wire), Postal's Patent No. 2,477,348 (barium and strontium oxide in a metal tube containing a conduction wire), Peters' Patent No. 2,495,867 (various heat-resistive compounds in bead form separating a pair of wires, all inside a tubular cable), and Peters' Patent No. 2,586,252 (beads like those of 2,495,867, with stainless steel or Inconel conductors). The purpose of the present invention is to provide a means for testing the integrity of such systems.

The trouble with test circuits heretofore used in this system is that they do not test the ability of the heat-sensitive material to respond to heat. Nor do they test the operation of the amplifiers, bridges and other components of the system. They usually had a device like that shown in Peters' Patent No. 2,586,252 which merely tested the electrical continuity of the conductors but gave no test of the actual integrity of the device. There was no way to test whether the amplifier and other elements in the fire-detection circuit were operating properly, nor could the heat sensor be electrically heated for test purposes without the electricity directly affecting the bridge and the amplifier, so that actuation of the alarm indicator did not really show that the system was operative.

The chief object of the invention is to provide an actual test for the integrity of the entire system, including the sensing element, the amplifiers, the bridges, etc., and the object is achieved by using two different types of power sources—one A.-C., the other D.-C.—one for operation and one for testing. To complete this device, in one form of the invention we use a test switch and in another form we use a blocking means for blocking the test power from getting to and actuating the alarm indicator.

Other objects and advantages of the invention will appear from the following description of two preferred forms thereof.

Figure 1:
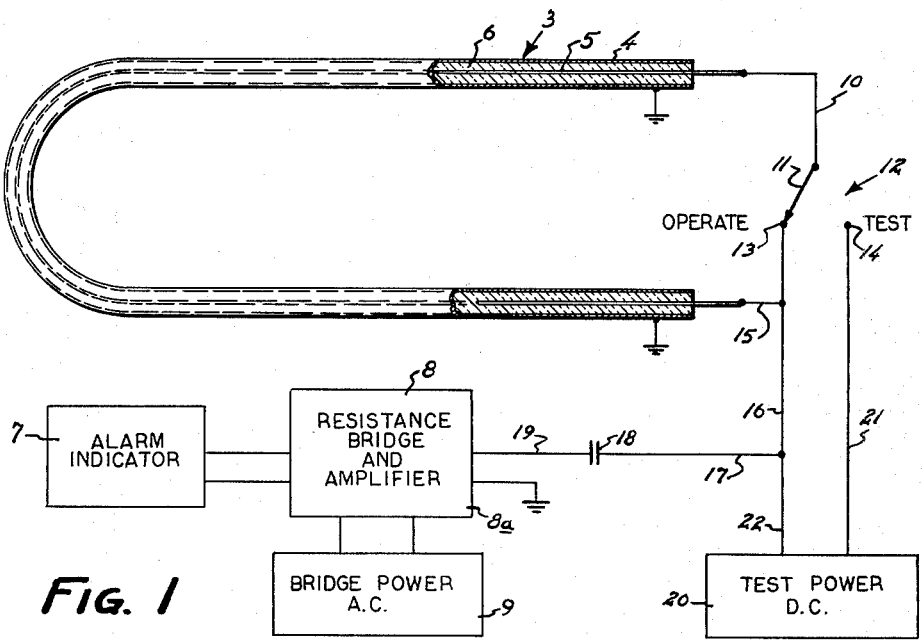
FIG. 1 is a diagrammatic view including a block-circuit diagram of one embodiment of the principles of the invention.

The drawings have been kept simple, since both the cable device and the bridge or amplifier alarm circuit are well known.

By way of illustration, a sensing element or detection cable 3 is shown, having a grounded conducting sheath 4 and a conducting wire 5 separated by a heat sensitive means 6 of the type shown in the patents mentioned earlier or any other suitable material of the type that rapidly changes conductivity when heated to a critical temperature. If desired, there may be two conductors inside a sheath, as in the Peters patents mentioned.

A grounded resistance bridge 8 monitors the resistance between the inner and outer conductors 4 and 5 of the sensing element 3, and an alarm indicator or warning signal means 7, preferably connected to the bridge 8 through an amplifier 8a (see FIG. 2), indicates the balance condition of the bridge 8. The bridge 8 is supplied with power by an A.-C. power source 9. A wire 10 leads from one end of the cable conductor 5 to a pole 11 of a switch 12. The switch 12 has an "operate" terminal 13 and a "test" terminal 14. A wire 15 connects the "operate" terminal 13 to the other end of the conductor 5. Wires 16 and 17 connect the "operate" terminal and the wire 15 to one side of a blocking condenser 18, and a wire 19 connects the other side of the blocking condenser 18 to the bridge and amplifier circuit 8. A D.-C. source 20 of test power is connected to the "test" terminal 14 by a wire 21 and to the wires 16 and 17 by a lead 22.

Normal operation is conventional, for the switch pole 11 is thrown to the "operate" terminal 13 and the test power source 20 is not in the circuit at all. The A.-C. power from the source 9 is not affected by the condenser 18, whose value is chosen to give a lower impedance to A.-C. current. The material 6 in the cable 3 has a high resistance until the critical temperature is reached, and then the resistance is markedly lowered, affecting the balance of the bridge 8, as shown by actuation of the alarm indicator 7.

For testing, the pole 11 is thrown to the "test" terminal 14. Then, D.-C. current from the source 20 flows through the cable 3, the value being high enough to heat the wire 5. However, the condenser 18 keeps the D.-C. test current from affecting the bridge 8 and the indicator 7. When the heat is enough to raise the material 6 to the critical temperature, the bridge 8 is unbalanced and the indicator 7 is actuated. The effect of the test circuit on the sensing element 3, on the bridge 8, on the amplifier 8a, and on the indicator 7 is identical to the effect resulting from an actual fire in the vicinity of the sensing element 3.

If there is a break in the sensing elements 3, there will be no current drawn from the test power supply 20 during test. Therefore, the sensing element 3 will not heat, and the indicator 7 will not be actuated, indicating a fault in the system. Similarly, if the bridge 8 or the amplifier 8a is faulty or the indicator 7 is not working, no alarm will be signalled during test, and the faulty system is thus exposed. Only if every part of the system is in perfect condition will the indicator 7 be actuated during test. Thus, this invention provides a test system which truly tests the integrity of the entire fire detector system.

Figure 2:
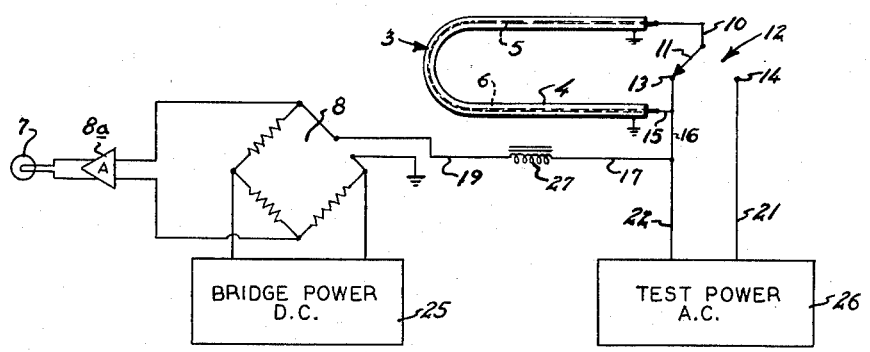
FIG. 2 is a similar view of another embodiment thereof.

The device in FIG. 2 is nearly identical. There is a D.-C. source 25 of power for the bridge 8, instead of the A.-C. source 9. There is an A.-C. source 26 of test power instead of the D.-C. source 20. And there is an inductance coil 27, in place of the condenser 18, to block the passage of A.-C. current to the bridge 8. Operation is exactly the same except for the obvious differences occasioned by these three substitutions.

Figure 3:
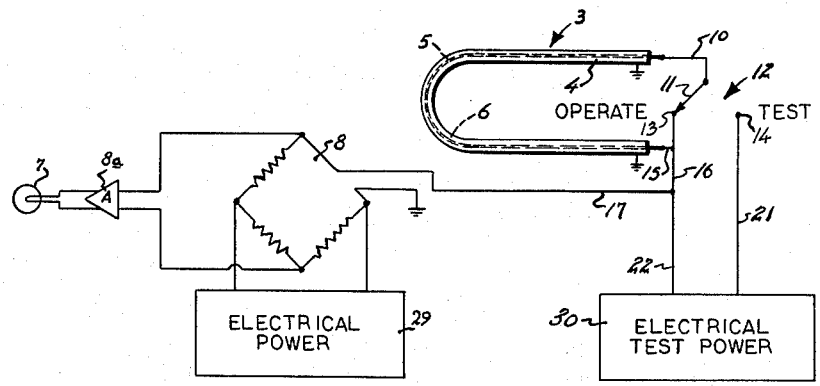
FIG. 3 is a similar view of another embodiment thereof.

In FIG. 3, the bridge 8 is supplied with power by a suitable power source 29 either A.-C. or D.-C. A source 30 of test power, either A.-C. or D.-C., is connected to the "test" terminal 14 by the wire 21 and to the wires 16 and 17 by the lead 22. The source 30, when in use, furnishes much more power than does the source 29.

For testing in the device of FIG. 3, the pole 11 is first thrown to the "test" terminal 14, so that current from the source 30 flows through the cable 3 at a value high enough to heat the wire 5. This current may at this time affect the alarm indicator 7. However, after a predetermined lapse of time, the switch 12 is turned off; i.e., the pole 11 is thrown back to the "operate" terminal 13. The switch 12 may be a well-known type of time-delay switch that automatically operates after a predetermined time and may also indicate that fact. It may even be a cycling type of switch. The time interval is so calculated that the cable 3 is then at or slightly beyond the critical temperature. If the system is operative, the bridge 8 is unbalanced, and the indicator 7 is actuated until the cable cools down below its actuating point. The effect on the sensing element 3, on the bridge 8, on the amplifier 8a and on the indicator 7 after the switch 12 is turned to "operate" after heating the cable 3, is identical to the effect resulting from an actual fire in the vicinity of the sensing element. The switch 12 may be so connected to the indicator 7 that it disconnects the indicator when the switch is thrown to the "test" position.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A fire detection system comprising a heat sensor having two electrical conductors spaced apart by a heat sensitive material which is of low electrical conductivity below a critical temperature and is more electrically conductive above said critical temperature, said heat sensor being connected in a comparator circuit with a first source of electrical potential and a warning device, heating of said heat sensitive material by a fire causing the resistance thereof to be lowered so that an unbalance potential is produced by said comparator circuit to actuate said warning device, a second source of electrical potential, and means for temporarily connecting the two ends of one of said conductors to said second source of potential to heat said one conductor and thereby heat said heat-sensitive material above said critical temperature to cause said warning device to be actuated so that the whole system is thereby tested.

2. A fire-detection system as claimed in claim 1 having blocking means in said comparator circuit to prevent current from said second source of electrical potential from flowing in said comparator circuit and actuating said warning device, but allowing current from said first source of electrical potential to flow in said comparator circuit.

3. A fire-detection system as claimed in claim 2 wherein said first source is an A.C. source and said second source is a D.C. source, and said blocking means comprises a capacitance.

4. A fire-detection system as claimed in claim 2 wherein said first source is a D.C. source and said second source is an A.C. source, and said blocking means comprises an inductance.

5. A fire-detection system as claimed in claim 1 wherein said means for temporarily connecting the two ends is a time-delay switch.

6. A fire-detection system as claimed in claim 1 wherein said means for temporarily connecting the two ends is a cycling type of switch.

7. A fire-detection system as claimed in claim 1 wherein said comparator circuit includes a normally balanced bridge network, said sensor forming one arm of said network so that a change in conductivity of said sensor unbalances said bridge and causes an unbalance potential derived from said first source of electrical potential to be applied to said warning device.

8. In a fire-detection system, the combination of two electrical conductors spaced apart by heat-sensitive means that is of low conductivity below a critical temperature and is more conductive above that temperature, two sources of electrical potential, one A.C. and one D.C., an electrically actuated warning device connected in series with said conductors, said heat-sensitive means and one said source, blocking means passing current from said one source between said warning device and said conductors and heat-sensitive means and blocking current from the other said source, and switch means between said blocking means and said conductors and heat-sensitive means for alternately connecting said other said source to said conductors and heat-sensitive means and for disconnecting said other said power source therefrom, whereby during testing said other said power source heats said heat-sensitive means without passing current from said other said source to said warning device, so that said warning device is then actuated only by said heat-sensitive means reaching said critical temperature.

9. The system of claim 8 in which said one source is D.C. and said other source is A.C. and said blocking means is an electrical condenser.

10. The system of claim 8 wherein said one source si D.C. and said other source is A.C. and said blocking means is a blocking inductance.

11. For use with a fire detector of the type having a cable comprising two electrical conductors spaced apart by heat-sensitive means that becomes electrically conductive at a critical temperature, a first source of electrical power, and a warning signal means, all in series, the improvement comprising an integrity testing device including a second source of electrical power, one of said first and second sources being A.C., the other being D.C., switch means for connecting said second source into series with said cable, and means between said switch and said warning signal means, for blocking passage of current from said second source to said warning signal means, so that said warning signal means is actuated during test only by said second source heating said heat-sensitive means to said critical temperature.

12. The device of claim 11 wherein said first source is the A.C. source, said second source is the D.C. source, and said means for blocking is capacitative.

13. The device of claim 11, wherein said first source is the D.C. source, said second source is the A.C. source, and said blocking means is inductive.

14. In a fire detecting system having a sensing element comprising two conductors separated by a heat-sensitive material that is of low conductivity below a critical temperature and is more conductive above that temperature, and having a device which monitors the resistance between said conductors, and having indicator means actuated by said device when the change of resistance between said conductors is sufficient, two sources of power, one A.C. and one D.C., a first one supplying said monitoring device and a second supplying electrical heating power to one of said conductors, a switch enabling said one conductor to be connected in series with said second power source in order to heat said one conductor electrically, a blocking means connected between said conductors and said monitoring device preventing current from said second power source from affecting said monitoring device when said one conductor is being heated electrically so that said monitoring device and said indicator can indicate the integrity of said fire detecting system.

15. The system of claim 14 in which said first source is the D.C. source, said second source is the A.C. source, and said blocking means is inductive.

16. The system of claim 14 in which said first source is the A.C. source, said second source is the D.C. source, and said blocking means is capacitive.

17. In a fire-detection system, having two electrical conductors spaced apart by heat-sensitive means that is of low conductivity below a critical temperature and is more conductive above that temperature, a source of electrical potential, and an electrically actuated warning device connected in series with said conductors, said heat-sensitive means and said source, the combination therewith of test means for electrically heating said heat-sensitive means to said critical temperature by passing electrical current through the length of one said conductor and means for preventing said electrical heating means from passing current to said warning device during a test period above said critical temperature so that said warning device is then actuated only by said heat-sensitive means reaching said critical temperature and thereby becoming more conductive.

18. For use with a fire detector of the type having a cable comprising two electrical conductors spaced apart by heat-sensitive means that becomes electrically conductive at a critical temperature, a first source of electrical power, and a warning signal means, all in series the improvement comprising an integrity testing device including a second source of electrical power for heating said heat-sensitive means, switch means for connecting said second source into series with said cable, and means for preventing passage of current from said second source from affecting said warning signal means when said heat-sensitive means has been heated to said critical temperature.

19. In a fire detecting system having a sensing element comprising two conductors separated by a heat-sensitive material that is of low conductivity below a critical temperature and is more conductive above that temperature, and having a device which monitors the resistance between said conductors, and having indicator means actuated by said device when the change of resistance between said conductors is sufficient, two sources of power, a first one for supplying said monitoring device and a second for supplying electrical heating power to one of said conductors, a switch enabling said one conductor to be connected in series with said second power source in order to heat said one conductor electrically, and means for preventing current from said second power source from directly affecting said monitoring device while said one conductor is above said critical temperature, so that said monitoring device and said indicator can indicate the integrity of said fire detecting system.

20. In a fire-detection system, the combination of a sensor having two electrical conductors spaced apart by heat-sensitive means that is of low conductivity below a critical temperature and is more conductive above that temperature, two sources of electrical potential, one A.C. and one D.C., a warning device connected in series with said sensor and said D.C. source actuated only by D.C. current, and switch means between said warning device and said sensor for connecting and disconnecting said A.C. source to said sensor to heat said sensor, so that said warning device is actuated only when said heat-sensitive means reaches said critical temperature.

21. In a fire-detection system, the combination of:
 a heat sensor having two electrical conductors spaced apart by heat-sensitive means that is of low conductivity below a critical temperature and is much more conductive above said critical temperature,
 first and second sources of electrical potential, said first source being connected in series with said sensor as a unit so that the series path goes through said heat-sensitive means,
 switch means for connecting said second source in series with one said conductor of said sensor, and for disconnecting said source therefrom, said second source supplying sufficient power when connected to said conductor to heat it and thereby to raise the temperature of said heat-sensitive means above said critical temperature,
 and electrically actuated warning means in circuit with said sensor and said first source, to indicate passage of current from said first source through said sensor heat-sensitive means,
 whereby during testing said second source heats said sensor above said critical temperature and is then disconnected, so that said warning device is then actuated only by the reaction of said heat-sensitive means at said critical temperature to said first power source.

22. For use with a fire detector of the type having a cable comprising two electrical conductors spaced apart by and in electrical series with heat-sensitive means that becomes electrically conductive at a critical temperature, a first source of electrical power, and a warning signal means, all in series, the improvement comprising an integrity testing device including a second source of electrical power for supplying more power than said first source and in amount sufficient to heat said cable to said critical temperature by passage through one conductor thereof, and switch means for connecting said second source into series with one conductor of said cable and for disconnecting it therefrom, so that said cable is heated by said second source to said critical temperature and then, upon disconnecting said second source, said warning signal means is actuated only by said first source and by the response of said heat-sensitive means to said critical temperature.

23. In a fire detecting system having a sensing element comprising two conductors separated by a heat-sensitive material that is of low conductivity below a critical temperature and is more conductive above that temperature, and having a device which monitors the resistance between said conductors, and having indicator means actuated by said device when the change of resistance between said conductors is sufficient to indicate passage of the critical temperature, two sources of power, a lesser one insufficient to heat said material to said critical temperature and the other a greater one capable of supplying electrical heating power to one of said conductors sufficient to raise the temperature of said material above said critical temperature, and a switch enabling said one conductor to be connected in series with said greater power source in order to heat said one conductor electrically to a point above said critical temperature and enabling disconnection at that time, so that said monitoring device and said indicator can indicate the integrity of said fire detecting system.

24. In a fire detecting system having a sensing element comprising two conductors separated by a heat-sensitive material that is of low conductivity below a critical temperature and is more conductive above that temperature, and having a device which monitors the resistance between said conductors, and having indicator means actuated by said device when the change of resistance between said conductors is sufficient to indicate passage of the critical temperature, two sources of power, a lesser one insufficient to heat said material to said critical temperature and the other a greater one capable of supplying electrical heating power to one of said conductors sufficient to raise the temperature of said material above said critical temperature, switch means enabling said one conductor to be connected in series with said greater power source to heat said one conductor electrically, and means for disconnecting said greater power source from said one conductor after said sensing element has been heated to a point above said critical temperature, so that said monitoring device and said indicator can indicate the integrity of said fire detecting system.

25. In a fire-detection system, the combination of a heat sensor having two electrical conductors spaced apart by heat-sensitive means that is of low conductivity below a critical temperature and is more conductive above that temperature, two sources of electrical potential, one supplying more power than the other, an electrically actuated warning device connected in circuit with said sensor and the smaller said source, and switch means between said warning device and said sensor for connecting the larger said source to said sensor to heat it, and means for disconnecting said switch from said sensor after said critical temperature is reached, so that said warning device is then actuated only by the reaction of said heat-sensitive means at said critical temperature to said smaller power source.

26. For use with a fire detector of the type having a cable comprising two electrical conductors spaced apart by heat-sensitive means that becomes electrically conductive at a critical temperature, a first source of electrical power, and a warning signal means, all in series, the improvement comprising an integrity testing device including a second source of electrical power for supplying sufficient power to heat said cable to said critical temperature, switch means for connecting said second source into series with said cable, and means for disconnecting it therefrom after said cable has been heated by said second source to said critical temperature, so that said warning signal means is then actuated only by said first source and by the response of said heat-sensitive means to said critical temperature.

References Cited by the Examiner
UNITED STATES PATENTS

| | | | |
|---|---|---|---|
| 2,782,401 | 2/57 | Boddy | 340—214 X |
| 2,895,104 | 7/59 | Hansen et al. | 340—255 X |
| 3,044,050 | 7/62 | Abromaitis | 340—233 |
| 3,090,038 | 5/63 | Klein et al. | |

NEIL C. READ, *Primary Examiner.*